United States Patent [19]

Tamura et al.

[11] Patent Number: 5,104,173

[45] Date of Patent: Apr. 14, 1992

[54] WINDOW MOLDING MEMBER FOR AUTOMOBILES, AND METHOD OF MANUFACTURING THE SAME

[75] Inventors: Tatsuya Tamura; Tetsuo Hotta, both of Yokohama, Japan

[73] Assignee: Hashimoto Forming Industry Co., Ltd., Japan

[21] Appl. No.: 686,855

[22] Filed: Apr. 18, 1991

Related U.S. Application Data

[63] Continuation of Ser. No. 423,055, Oct. 18, 1989, abandoned.

[51] Int. Cl.$^5$ ............................................. B60J 10/02
[52] U.S. Cl. ...................................... 296/93; 296/208
[58] Field of Search ........................... 296/93, 208, 213

[56] References Cited

U.S. PATENT DOCUMENTS

| 4,678,696 | 7/1987 | Maeno et al. ................... 296/93 X |
| 4,757,659 | 7/1988 | Miyakawa et al. ............... 296/93 X |
| 4,757,660 | 7/1988 | Miyakawa et al. ............... 246/93 X |
| 4,765,673 | 8/1988 | Frabotta et al. .................... 296/93 |

FOREIGN PATENT DOCUMENTS

| 310262 | 4/1989 | European Pat. Off. .............. 296/93 |
| 0319262 | 6/1989 | European Pat. Off. . |
| 2564891 | 11/1985 | France ................................... 296/93 |
| 2565621 | 12/1985 | France ................................... 296/93 |
| 231814 | 10/1987 | Japan ..................................... 296/93 |
| 63-4712 | 1/1988 | Japan ..................................... 296/93 |
| 159126 | 7/1988 | Japan ..................................... 296/93 |

Primary Examiner—Johnny D. Cherry
Assistant Examiner—Andrew C. Pike
Attorney, Agent, or Firm—Stevens, Davis, Miller & Mosher

[57] ABSTRACT

A window molding member for automobiles includes upper and side segments to extend along upper and side edges of a window plate, respectively. Each segment comprises a leg section projecting from its main body to be inserted into a gap between the window plate and an automobile body panel. The leg section has a pair of webs defining a groove therebetween, for accommodating the edge of the window plate, and defines a channel along the side edge of the window plate. The molding is manufactured by a method which includes the steps of extruding continuous bodies corresponding to the main body and the leg section of the molding member, removing a predetermined amount of material from at least one of the extruded continuous bodies, and thereafter causing the extruded bodies to adhere with each other.

7 Claims, 10 Drawing Sheets

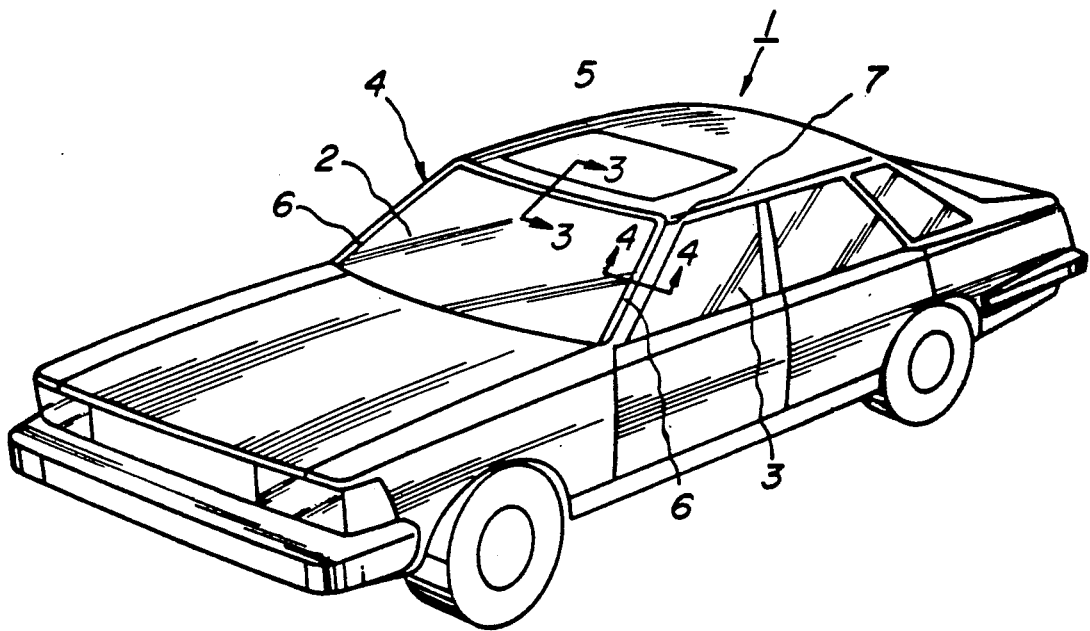
FIG_1

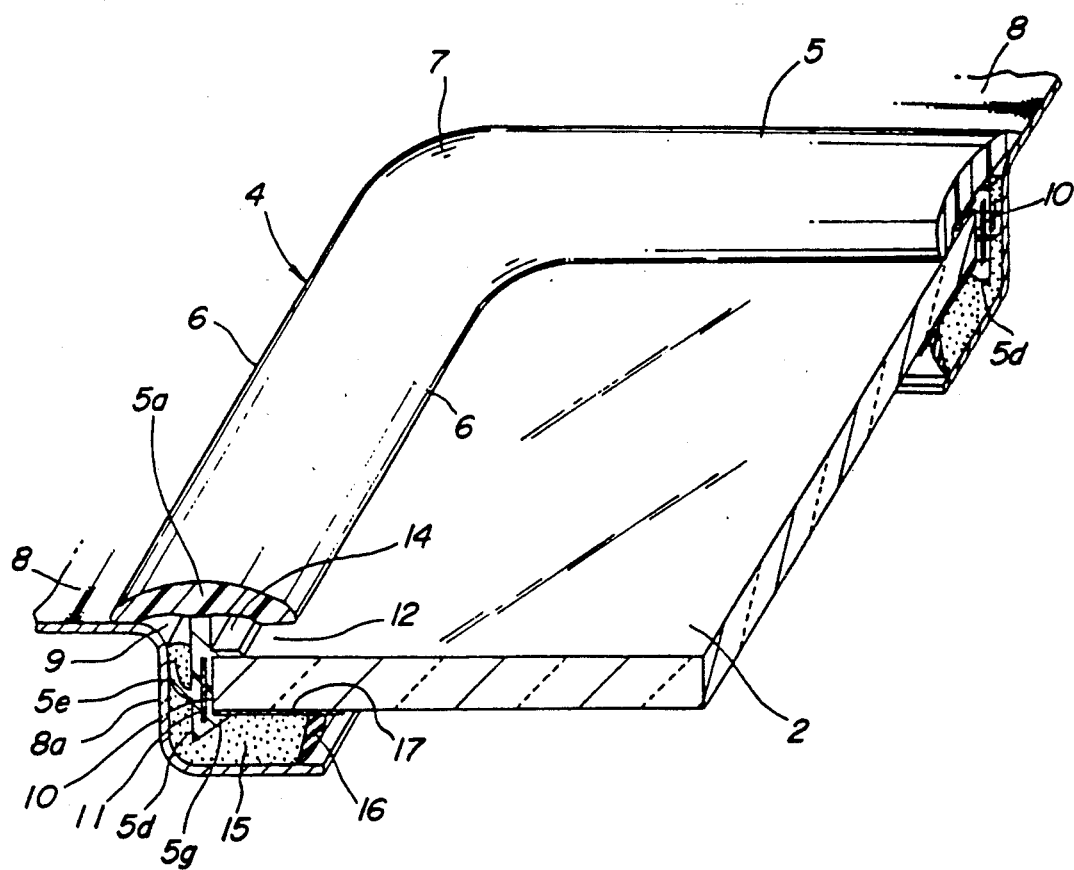
FIG_2

FIG_3
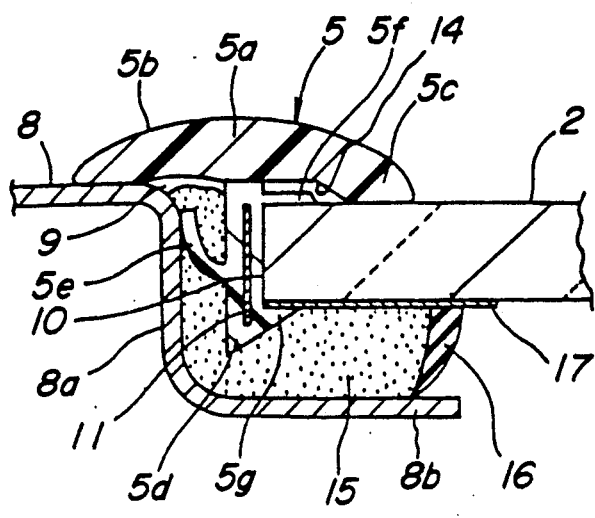
FIG_4
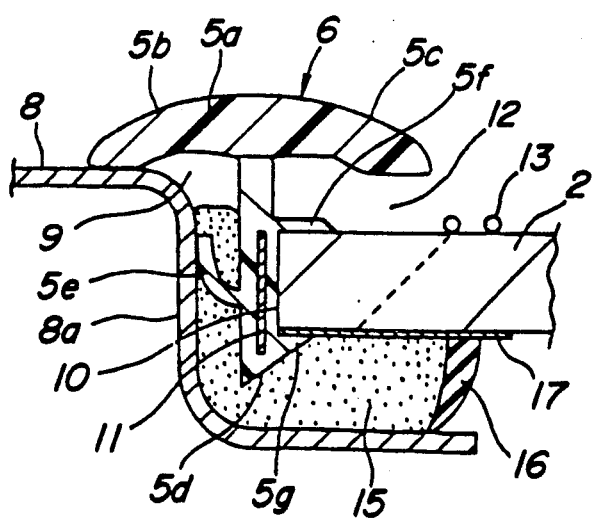

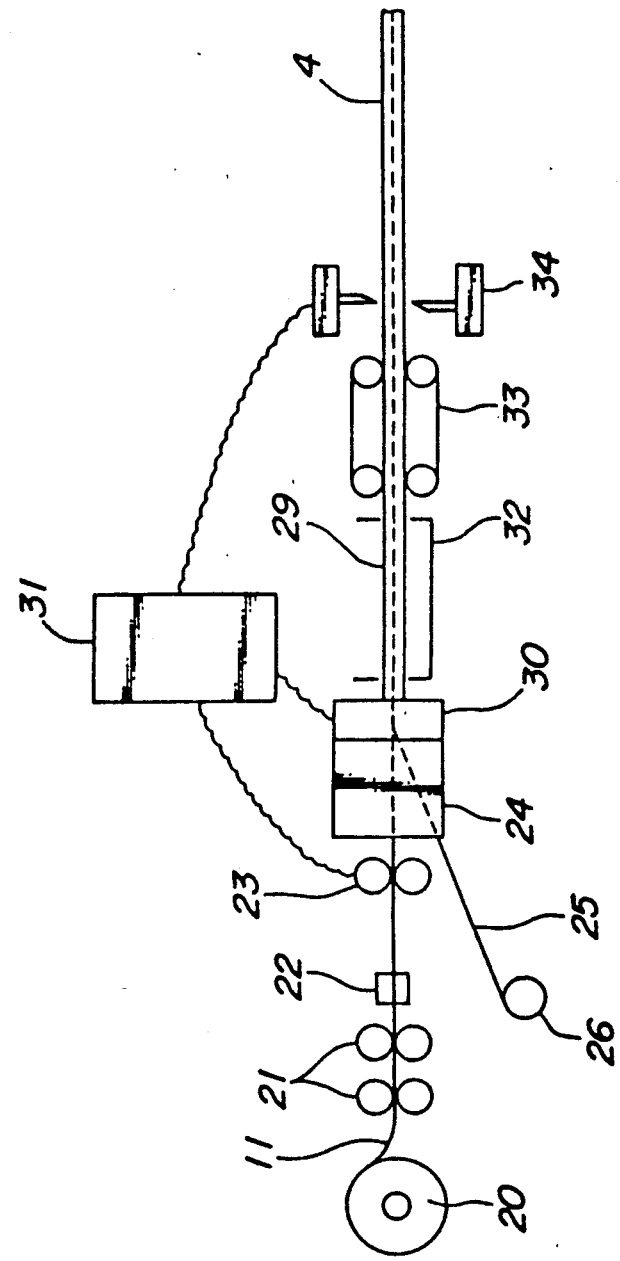

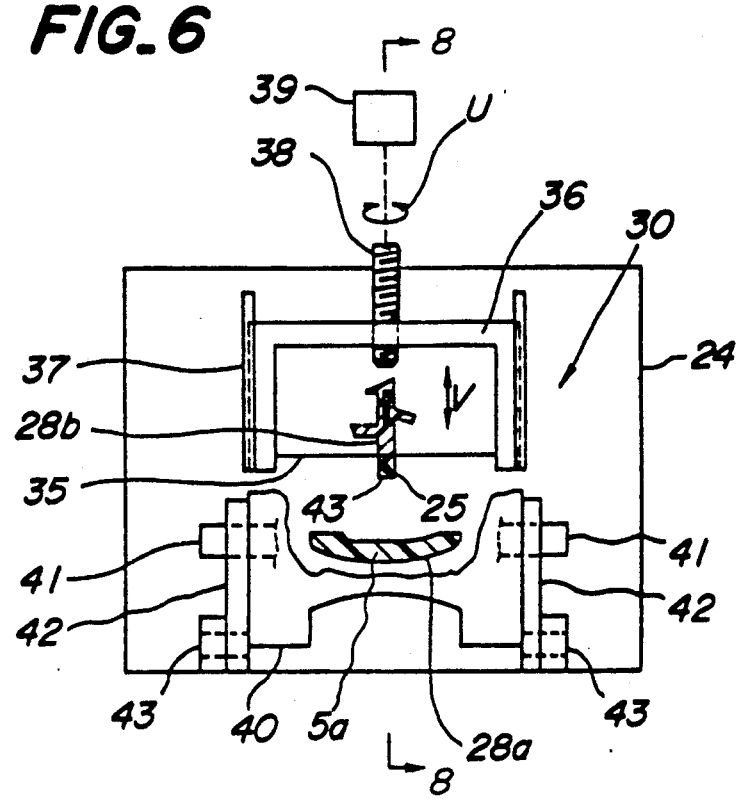
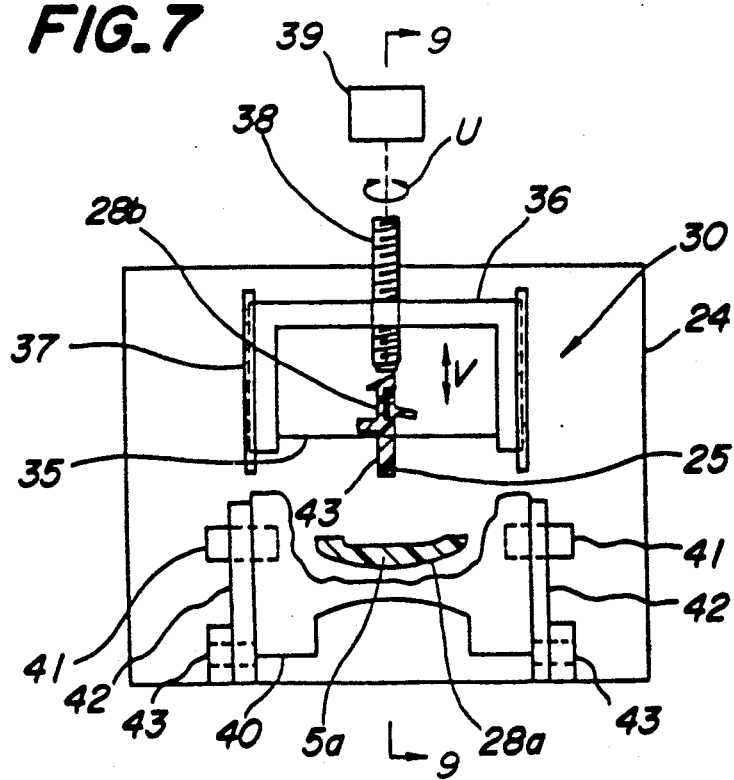

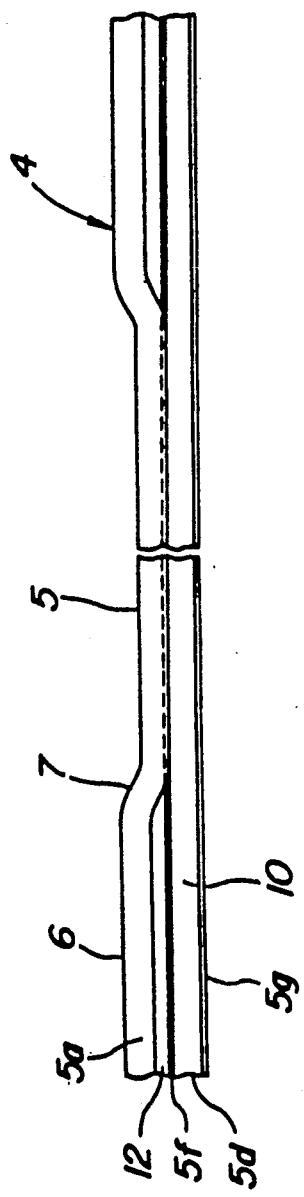
FIG_12
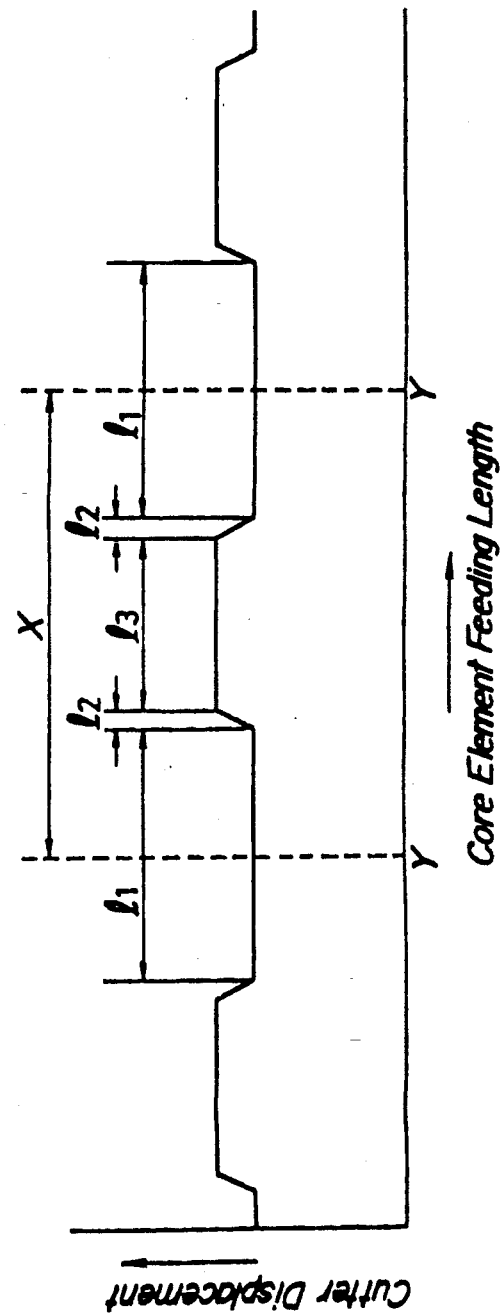
FIG_13

FIG_14a
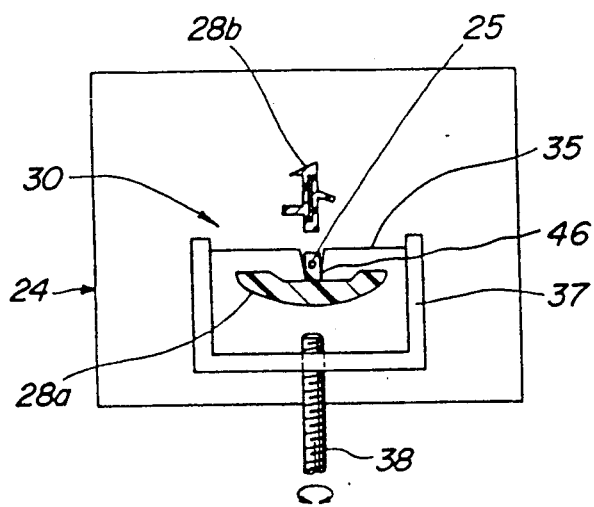
FIG_14b
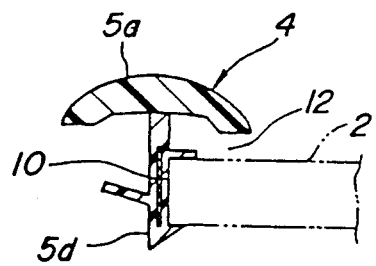
FIG_14c
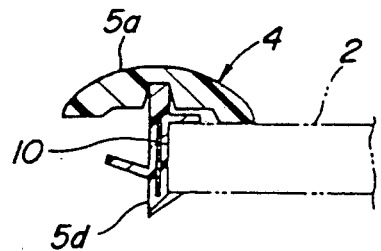
FIG_15a
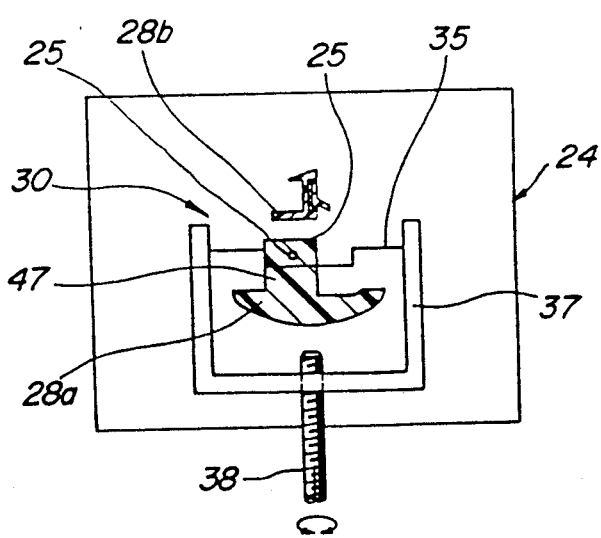
FIG_15b
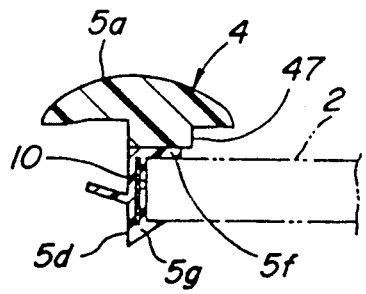
FIG_15c

WINDOW MOLDING MEMBER FOR AUTOMOBILES, AND METHOD OF MANUFACTURING THE SAME

This application is a continuation of application Ser. No. 423,055, filed Oct. 18,1984, now abandoned.

BACKGROUND OF THE INVENTION

1. Field of the Invention

The present invention relates to window molding members for automobiles, having a cross section which varies in the longitudinal direction thereof, as well as a method of manufacturing such molding members.

2. Description of the Related Art

Typically, window molding members are used in combination with automobiles including a body panel with an outer surface, a flange recessed from the outer surface, and a shoulder portion connecting the flange with the outer surface. The flange of the body panel serves to mount a window plate thereon, with the peripheral edge of the plate opposed to the shoulder portion of the body panel leaving a gap therebetween.

A number of kinds of window molding members, adapted to satisfy various functional and/or ornamental requirements, are known and widely used for automobiles. Among others, U.S. Pat. Nos. 4,757,659 and 4,757,660 each discloses a window molding member having a crosssection which varies in the longitudinal direction of the molding member. This molding member includes an upper segment to extend along the upper edge of the window plate, a pair of side segments to extend along the side edges of the window plate, and a pair of corner segments integrally and continuously connecting the upper and side segments with each other in the longitudinal direction of the molding member.

In the known molding members mentioned above, each segment includes a main body adapted to cover the gap between the peripheral edge of the window plate and the shoulder portion of the body panel. The main body is provided with first and second lip sections on both sides, of which the first lip section is adapted to be brought into contact with the outer surface of the body panel. Each segment further includes a leg section which is integral with, and projects from, the main body to extend into the gap. The leg section is provided, on its one side, with first and second support webs to project toward the window plate. The first web on the leg section cooperates with the second lip section of the main body to form channels along the side segments for guiding the flow of rain water on the window plate, and to form a first groove for accommodating the upper edge of the window plate. The second web, in turn, cooperates with the first web along the side segments to form second grooves for accommodating the side edges of the window plate, and is removed away along the upper segment, together with a portion of the leg section.

With such an arrangement of the known molding members, the second lip section of the main body for the upper segment is adapted to be brought into contact with the window plate along the upper edge thereof, and thus serves as a flush outer surface of the automobile body along the upper edge of the window plate. The second lip section of the main body for the side segments achieves the function of preventing rain water on the window plate from flowing onto side windows across the side segment and neighbouring body panel portion (or pillar) by guiding the rainwater so as to flow along the channels without disturbing the driver's sight through the side windows.

In order to manufacture such molding members, a synthetic resin material is extruded from an extrusion die head into a continuous body of a crosssection which is constant throughout the entire length. Subsequently, the continuous body is cut into individual blank bodies with a predetermined length of a molding member. Each blank body is then subjected to removal of the first web along the regions corresponding to the corner segments, and also to removal of the second web and a part of the leg section along the region corresponding to the upper segment. A time-consuming delicate operation is required to effect the above-mentioned local cutting of the webs accurately, so that it is difficult to improve the manufacturing productivity and to significantly reduce the cost.

Moreover, since the first and second grooves have to be aligned with each other to accommodate the edge of the window plate, the corner segment tends to be excessively deformed when inserting the edge of the window plate into the grooves, and cannot be readily inserted into the gap between the shoulder portion of the body panel and the window plate. The deformed regions of the molding member are often apparently visible from outside, thereby significantly deteriorating the appearance.

SUMMARY OF THE INVENTION

Accordingly, it is a primary object of the present invention to provide a novel window molding member with a longitudinally variable crosssection, which can be readily manufactured with higher accuracy and productivity, and which can be easily combined with a window plate and mounted in place without deteriorating the appearance.

It is another object of the present invention to provide a method which is capable of readily manufacturing, with higher accuracy and productivity, window molding members with a longitudinally variable crosssection, which can be easily combined with a window plate and mounted in place without deteriorating the appearance.

According to one aspect of the present invention, there is provided a window molding member for automobiles including a body panel having an outer surface, a flange which is recessed from said outer surface, and a shoulder portion connecting said flange with said outer surface, as well as a window plate mounted on said flange of the body panel. The window plate has a peripheral edge opposing to said shoulder portion of the body panel so as to form a gap therebetween, said molding member including an upper segment to extend along an upper edge of the window plate, at least one side segment to extend along at least one side edge of the window plate, and at least one corner segment integrally and continuously connecting said upper and side segments with each other in the longitudinal direction of said molding member.

Each segment has a main body adapted to cover said gap, with first and second lip sections on both sides thereof, said first lip section being adapted to be brought into contact with said outer surface of said body panel.

Each segment also has a leg section which is integral with, and projects from said main body to extend into said gap with a predetermined projection length, as measured between said main body and its free end.

Each segment further has means for defining a groove on one side of said leg section, which is adapted to accommodate said peripheral edge of the window plate, said groove being arranged at a predetermined distance from the free end of said leg section, which is constant throughout the entire length of said molding member.

The leg section has a first projection length along said upper segment, and a second projection length along said side segment which is greater than said first projection length, such that said second lip section of the main body for said upper segment is adapted to be brought into contact with the outer surface of said window plate, while said second lip section of the main body for said side segment is adapted to be spaced from said window plate to define a channel between said second lip section of the main body and said window plate.

According to another aspect of the present invention, there is provided a method of manufacturing window molding members with the above-mentioned arrangement.

This method includes using a single extrusion die head with a first orifice of a crosssection substantially corresponding to that of said main body of the molding member, and a second orifice of a crosssection substantially corresponding to that of said leg section of the molding member.

The method includes forming first and second continuous bodies by simultaneously extruding at least one kind of synthetic resin material from said first and second orifices in said die head.

The method also contemplates partially removing material from at least one of said first and second continuous bodies successively, along a longitudinal region for said upper segment of the molding member, and by an amount which at least corresponds to the difference between said first projection length and said second projection length of said leg section.

The method is concluded by subsequently causing said first and second continuous bodies to adhere with each other, while they are still sufficiently hot to achieve an adhesion, to form a continuous composite body corresponding to a plurality of molding members; and cutting said composite body into a predetermined length of a molding member.

BRIEF DESCRIPTION OF THE DRAWINGS

FIG. 1 is a perspective view of an automobile including a window molding member in accordance with the present invention;

FIG. 2 is a partly broken away perspective view of the molding member mounted in place, showing the corner segment for continuously connecting the upper and side segments with each other;

FIG. 3 is a cross-sectional view taken along the line 3—3 in FIG. 1, showing the upper segment of the molding member;

FIG. 4 is a cross-sectional view taken along the line 4—4 in FIG. 1, showing the side segment of the molding member;

FIG. 5 is a schematic diagram of a production line which may be used to carry out the method according to the present invention for continuously manufacturing the molding member;

FIG. 6 is a front view of the extrusion die head, with the movable cutter element of the shaping device assuming one operative position corresponding to the formation of the side segment;

FIG. 7 is a front view of the extrusion die head, with the movable cutter element of the shaping device assuming another operative position corresponding to the formation of the upper segment;

FIG. 12 is a fragmentary front view of a molding member;

FIG. 13 is a diagram showing the relationship between the feeding length of the core element and the displacement of the movable cutter element of the shaping device;

FIGS. 14a, 15a and 16 are front views, similar to FIGS. 6 and 7, showing other embodiments of the shaping device, respectively;

FIGS. 14b and 15b are crosssectional views showing other embodiments of the side segment manufacturing by using the shaping device of FIGS. 14a and 15a, respectively; and FIGS. 14c and 15c are crosssectional views showing other embodiments of the upper segment manufactured by using the shaping device of FIGS. 14a and 15a, respectively.

DETAILED DESCRIPTION OF THE PREFERRED EMBODIMENTS

Figure 8:
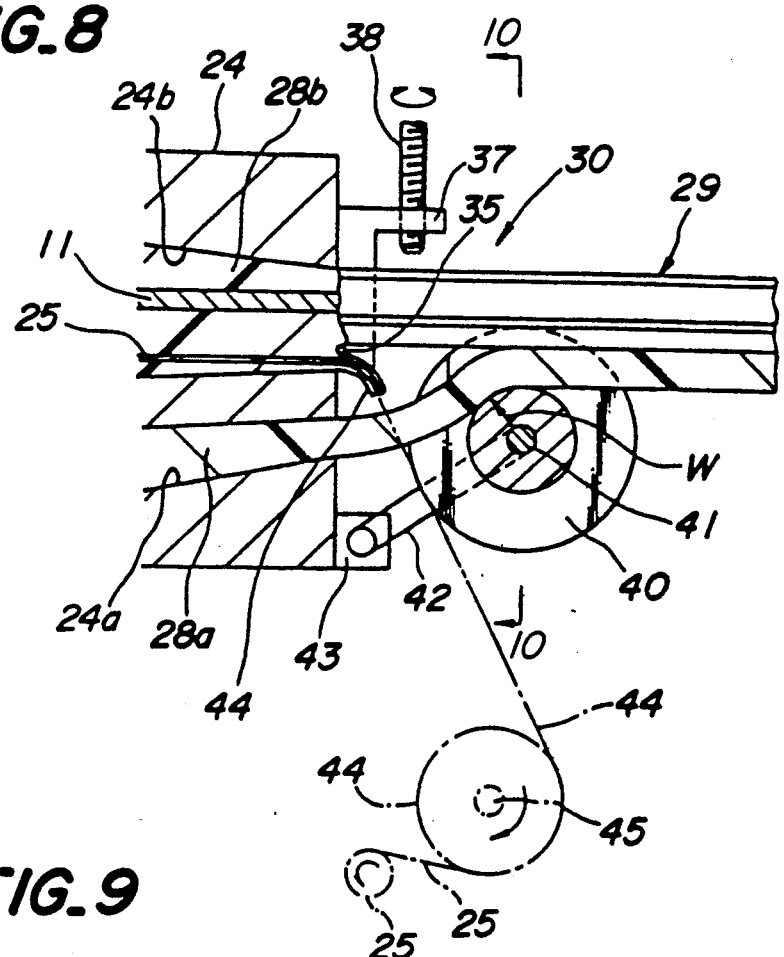
FIG. 8 is a sectional view taken along the line 8—8 in FIG. 6.

The present invention will be more fully explained hereinafter, with reference to some preferred embodiments shown in the attached drawings.

There is shown in FIG. 1 an automobile with a body 1, a front window or windshield plate 2, side windows 3, as well as a windshield molding member 4 according to the present invention, which is to be arranged along the periphery of the windshield plate 2. The windshield plate 2 may be an inorganic glass plate or appropriate synthetic resin plate with transparency, such as polycarbonate or acrylic resin plate. The molding member 4, as shown in FIG. 2, includes an upper segment 5 to extend along an upper edge of the windshield plate 2, a pair of side segments 6 to extend along the side edges of the windshield plate 2, and a pair of corner segments 7 continuously connecting the upper and side segments 5, 6 into an integral component.

The molding member 4 may be composed of a soft polyvinyl-chloride (PVC) resin, ionomer resin, ethylene-vinyl acetate (EVA) copolymer resin, transparent cellulose acetate butylate (CAB) resin, or of other suitable thermoplastic elastomer or synthetic resin with flexibility, extruded into respectively predetermined crosssections of the upper, side and corner segments 5, 6, 7 which are basically same and only slightly different from each other.

As shown more particularly in FIGS. 2 and 3, the upper segment 5 includes a main body 5a which is provided with a first lip section 5b to be engaged with the outer surface of the vehicle body panel 8 throughout the entire length of the molding member 4, a second lip section 5c to be engaged with the outer surface of a windshield plate 2 along the upper segment 5 of the molding member 4, and a leg section 5d to be inserted into a gap 9 between the edge of the windshield plate 2 and a stepped shoulder portion 8a which is recessed from the outer surface of the body panel 8. The leg section projects from the main body to extend into the gap 9 with a predetermined projection length as measured between the main body 5a and the free end of leg section 5c. To prevent undesirable withdrawal of the leg section 5d out of the gap 9, the leg section 5d has at least one fin 5e on one side thereof, which is to be engaged with the shoulder portion 8a of the body panel 8. The leg section 5d further includes first and second webs 5f, 5g on another side thereof, which are spaced from each other substantially by a distance corresponding to the thickness of the windshield plate 2, and adapted to engage with outer and rear surfaces of the windshield plate, respectively. The first and second webs 5f, 5g define a groove 10 which serves to accommodate the edge of the windshield plate 2 therein. The segment 5 has at least one core element 11 arranged in the leg section 5d, which is preferably composed of a metal strip with a high resistivity to rust, such as aluminum or stainless steel strip. The core element 11 may also include other material with a low elongation, such as a strand of glass- or carbon-fibers, or cords of appropriate fiber materials, such as polyester fibers or the like.

The side segment 6, as shown in FIG. 4, has a basic crosssection which is substantially same as that of the above-mentioned upper segment 5, except that the leg section 5d thereof is slightly longer than the comparable leg section for the upper segment 5. As shown in FIG. 3 such that the second lip section 5c of the main body 5a as shown in FIG. 4 is spaced from the outer surface of the windshield plate 2 along the side segments 6. Thus, a channel 12 (see FIG. 4) is defined between the lip section 5c and the windshield plate 2 to extend along each side edge of the windshield plate 2, whereby rain water 13 on the windshield plate 2 can be prevented from flowing onto the side windows 3 across the side segment 6 and the neighbouring pillar of the vehicle body 1, by guiding the rain water to flow along the channel 12 without disturbing the driver's sight through the side windows 3. The second lip section 5c of the main body 5a, which as shown in FIG. 3 is brought into contact with the outer surface of the windshield plate 2 along the upper segment 5, as mentioned above, serves to realize a so-called flush outer surface along the upper edge of the windshield plate 2. The corner segments 7 for continuously connecting the upper and side segments 5, 6 into an integral component are of a crosssection which gradually changes from that of the upper segment 5 to that of the side segment 6.

In the above-mentioned molding member 4 according to the present invention, as shown in FIGS. 2 to 4, the groove 10 between the webs 5f, 5g for accommodating the edge of the windshield plate 2 extends in a plane continuously along the upper, side and corner segments 5, 6, and 7. To mount the molding member 4 in place, the upper and side edges of the windshield plate 2 may be inserted into the groove 10 of the molding member 4 before the plate 2 is adhered to a flange portion 8b of the body panel 8 by means of an adhesive material 15. A dam rubber 16 is arranged at the end of gap 9. The window plate 2 is covered by an opaque printed layer 17 on the periphery of the rear surface thereof. Alternatively, the windshield plate 2 may be firstly mounted on the flange portion 8b of the body panel 8, with the molding member 4 being subsequently inserted into the gap 9 before the adhesive material 15 hardens. The insertion of the molding member 4 into the gap 9 can be carried out easily, due to a longitudinal alignment of the groove 10 throughout the entire length of the molding member 4.

Advantageously, the second lip section 5c of the main body 5a is formed with a recess 14 (FIG. 3) in its rear surface opposite to the windshield plate 2. This recess has a depth which is slightly greater than the thickness of the web 5f. Thus, the web 5f along the upper segment 5 can be completely accommodated within the recess 14, making it possible to achieve a complete contact of the lip section 5c with the windshield plate 2, even when the groove 10 engaging the edge of the plate 2 is defined by the web 5f on the outer side of the plate 2.

Thus the proportions of molding member are such that the groove is spaced from the second lip section by a first predetermined distance along the upper segment of the window molding member and is spaced by a second predetermined distance from the second lip section along the side segment of the window molding member. The second predetermined distance is greater than said first predetermined distance and the arrangement is such that the second lip section of the main body for the upper segment contacts the outer surface of the window plate. The second lip section for the side segment defines the channel 10 between the second lip section and the window plate. The shoulder portion of the body panel 8 is at a third predetermined distance from the outer surface of the body panel and the outer surface of the window plate 2 at a first region, (which corresponds to the upper segment 5 of the window molding member) and the shoulder portion is at a fourth predetermined distance from the outer surface of the body panel. The outer surface of the window plate 2 at a second region (which corresponds to the side segment 6 of the window molding member) and the fourth predetermined distance of the shoulder portion is greater than the third predetermined distance, and the second predetermined distance along the side segment is greater than the first predetermined distance along the upper segment by an amount which is substantially the same as the difference between the third and fourth predetermined distances of the shoulder portion, respectively.

Figure 9:
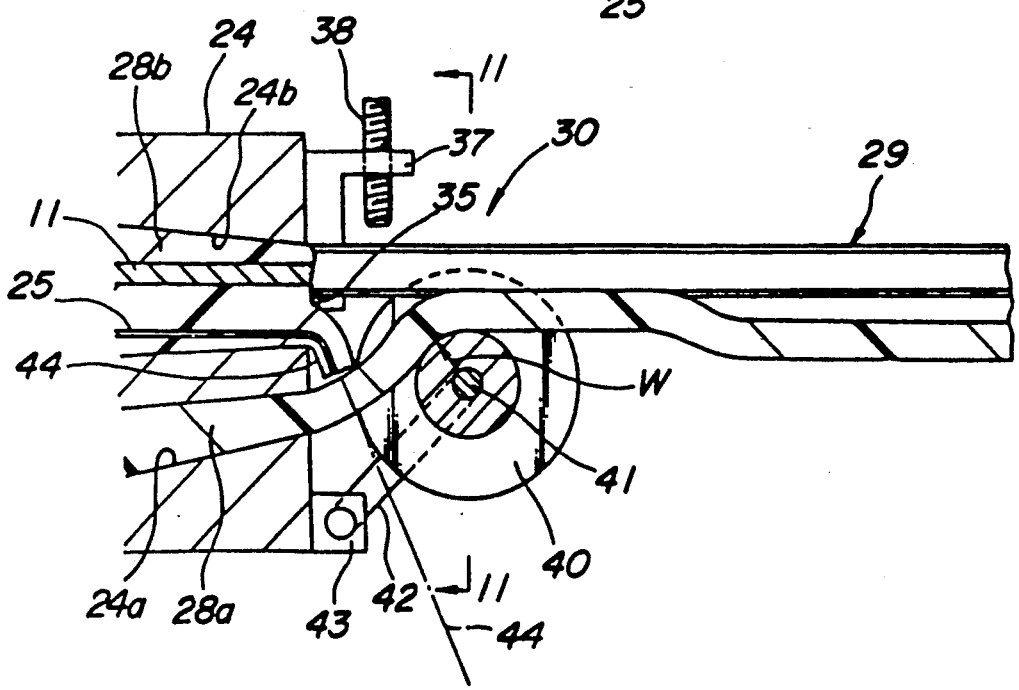
FIG. 9 is a sectional view taken along the line 9—9 in FIG. 7.
Figure 10:
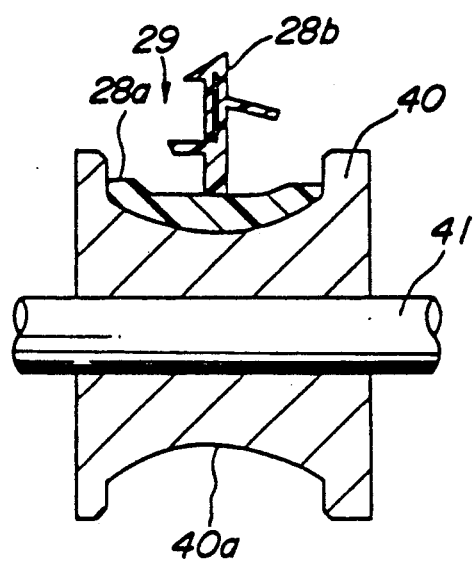
FIG. 10 is a sectional view taken along the line 10—10 in FIG. 8.
Figure 11:
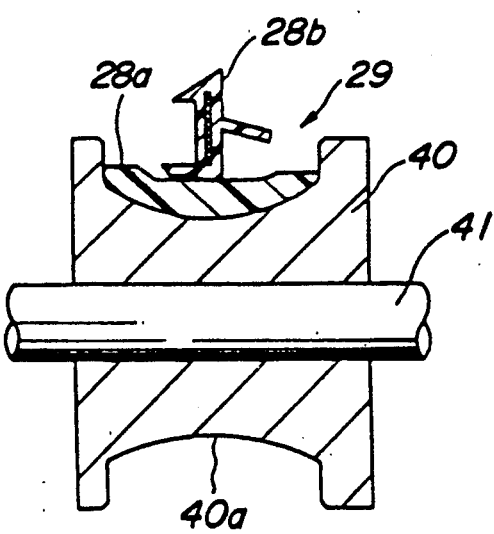
FIG. 11 is a sectional view taken along the line 11—11 in FIG. 9.

FIG. 5 shows the schematic diagram of a production line, which may be used to continuously manufacture the above-mentioned molding members 4 in accordance with the present invention. The production line includes an uncoiler 20 and associated pinch rollers 21 for feeding the core element 11. The core element 11 is preferably passed through a roll coating device 22 where it is applied with an appropriate adhesive material and subjected to baking. The feeding length of the core element 11 is detected by a detector 23, such as a rotary encoder. The core element 11 is fed to an extrusion die head 24 which is connected to an extruder, not shown. The extruder is adapted to heat appropriate one of the above-mentioned thermoplastic resins, e.g. PVC resin, to a temperature higher than its softening temperature, which is then fed to the die head 24 in a molten state. The die head 24 has a pair of orifices 24a, 24b which are arranged spaced from, but close to each other (FIGS. 8 and 9). The orifice 24a has a crosssection which corresponds to that of the main body 5a, while the orifice 24b has a crosssection which corresponds to the leg section 5d with the fin 5e and the webs 5f, 5g.

If necessary, the die head 24 may be connected with two extruders which are adapted to feed to the die head 24 mutually compatible synthetic resin materials which are different in color, transparency and/or hardness. In this case, if the mutually compatible resins do not still exhibit a sufficient adhesion to each other, at least one of the continuous bodies extruded from the orifices 24a, 24b may be applied with an adhesive material by appropriate roll coater, immediately after the extrusion.

Advantageously, an additional core element 25 from another uncoiler 26 also is supplied to the die head 24 as shown in FIG. 5. The additional core element 25 may be composed of a thread or cord of natural or synthetic fiber material with a sufficient heat resistivity, which is coextruded with and embedded in the synthetic resin material forming the leg section 5d, specifically in that end region which is to be opposed to the main body 5a.

The molten synthetic resin material is extruded, together with the core elements 11, 25, from the orifices 24a, 24b of the die head 24 simultaneously, as continuous extruded bodies 28a, 28b. Immediately after the extrusion, the extruded body 28b corresponding to the leg section 5d of the molding member 4 is subjected to such a cutting that a predetermined amount of its synthetic resin material is removed, inclusive of the above-mentioned end region in which the additional core element 25 is embedded, thereby to adjust the length of the leg section 5d in accordance with the feeding length of the core element 11. The extruded bodies 28a, 28b are then caused to adhere with each other while they are still sufficiently hot to achieve an adhesion, so as to form a continuous composite body 29 with a crosssection which varies in the longitudinal direction in accordance with the feeding length of the core element 11. To this end, a shaping device 30 to be described hereinafter with reference to FIGS. 6 to 9 is arranged adjacent to, and on the discharge side of the die head 24, and is controlled by a controller 31 which is connected to the detector 23. The continuous composite body 29, in which the extruded bodies 28a, 28b are adhered with each other, is subsequently guided through a cooling tank 32 by a hauling device 33, and cut into a predetermined length of a molding member 4 by a cutting device 34 which also is connected with and controlled by the controller 31 in accordance with the feeding length of the core element 11.

Referring to FIGS. 6 to 9, the shaping device 30 includes a movable cutter element 35 in the form of a wire under a predetermined tension, mounted on a frame 36 which is vertically movably supported by a guide member 37 arranged adjacent to the die head 24. To this end, the frame 37 is threadedly engaged with a screw rod 38 which is connected to an output shaft of a reversible servomotor 39 which, in turn, is connected to the controller 31. Thus, the vertical position of the cutter element 35, and hence the length of the leg section 5d of the molding member 4, can be controlled in accordance with the feeding length of the core element 11. The shaping device 30 further includes, as shown in FIGS. 8 to 11, a rotatable guide roller 40 for guiding the extruded body 28a corresponding to the main body 5a of the molding member 4. The guide roller 40 is arranged on the lower rear side of the cutter element 35, and is formed in its outer periphery with a guide groove 40a (FIGS. 10 and 11) with a crosssectional shape corresponding to that of the main body 5a. The guide roller 40 is rotatably supported by a shaft 41 which is mounted on a pair of swing arms 42. These swing arms 42 are supported by brackets 43 on the die head 24, and are resiliently biased by a spring, not shown, in a direction indicated by an arrow W, in which the extruded body 28a for the main body 5a is urged against the extruded body 28b for the leg section 5d. Because the extruded body 28a is guided by the groove 40a in the roller 40 in a still hot and soft state of the resin, the groove 40a is preferably composed of stainless steel, ceramics, appropriate synthetic resin or the like material having a smooth outer surface and exhibiting a poor adhesion to the extruded body 28a.

For a molding member 4 with the side segments 6 of a length $\lambda_1$, the corner segments 7 of a length $\lambda_2$ and the upper segment of a length $\lambda_3$, the relationship between the feeding length of the core element 11 and the vertical displacement of the movable cutter element 35 of the shaping device 30 is as shown in FIG. 13.

More particularly, starting by way of example from an operational mode shown in FIGS. 6 and 8 of the production line, the synthetic resin material is simultaneously extruded into continuous bodies 28a, 28b, with the cutter element 35 of the shaping device 30 assuming a lowermost position such that a predetermined minimum amount of the material 44 of the continuous body 28b for the leg section 5d is removed together with the core element 25. Subsequently, the continuous body 28a for the main body 5a is guided by the guide roller 40 and resiliently urged against the continuous body 28b into adhesion with each other, to form a continuous composite body 29 with the crosssection of the side segment 6.

As the detector 23 detects the feeding length $\lambda_1$ of the core element 11, or completion of the formation of a side segment 6, the servomotor 39 is actuated to drive the screw rod 38 and gradually displace the cuter element 35 such that the continuous extruded body 28b for the leg section 5d of the molding member 4 is subjected to the removal of gradually increasing amount of material to form a composite body 29 with the crosssection of a corner segment 7.

Upon a subsequent detection of the feeding length $\lambda_2$ of the core element 11, or of the completion of the formation of a corner segment 7, the servomotor 39 is stopped by the controller 31. On this occasion, as shown in FIGS. 7 and 9, the cutter element 35 has already been fully displaced to assume an uppermost position for removing a predetermined maximum amount of the material 44 from the continuous body 28b for the leg section 5d to form the composite body 29 with the crosssection of an upper segment 5.

As the detector 21 detects the feeding length $\lambda_3$ of the core element 11, or completion of the formation of an upper segment 5, the servomotor 39 is actuated to drive the screw rod 38 in a reverse direction and displace the cutter element 35 back to its initial position shown in FIGS. 6 and 8, forming a composite body 29 for another corner and side segments 7, 6 in an opposite sequence.

These steps are repeated to continuously produce a desired number of the molding members 4. It is of course that the individual molding members 4 as shown in FIG. 12 are obtained by cutting the continuous composite body 29 into the predetermined length by means of the cutting device 34. The length of each molding member 4 ($=2\lambda_1=2\lambda_2=\lambda_3$) is represented in FIG. 13 by X, and the locations of the continuous composite body 29 to be cut into the predetermined length by the cutting device 34 are shown at Y.

During the above-mentioned steps, the extruded body 28b for the leg section 5d is thus subjected to a continuous removal of a predetermined amount of its material, inclusive of the end region in which the additional core element 25 is embedded. The removed material 44 together with the additional core element 25 is preferably hauled under a tension and at the same speed as the composite body 29, and wound about a hauling roller 45 which is driven with a constant torque, as shown by an imaginary line in FIG. 8.

The removed material 44 is sufficiently reinforced by the additional core element 25, and can thus be stably hauled even under a tension without accompanying undesirable elongation or breakage. When the additional core element 25 is composed of a thread or cord with a circular cross-section, the removed material 44 can be advantageously hauled in a desired direction. However, the core element 25 may also be composed of a tape of polyester or the like resin material, or of a strip of aluminum or the like metal sheet. The additional core element 25 is preferably embedded in the synthetic resin material for the leg section 5*d* such that it is partly exposed outside. Then, the core element 25 and the synthetic resin material 44 can be readily separated from each other, and recovered and used once again, if necessary.

Other embodiments of the method according to the present invention will be explained below with reference to FIGS. 14*a* to 14*c*, FIGS. 15*a* to 15*c* and FIG. 16.

In the embodiment shown in FIGS. 14*a* to 14*c*, the continuous bodies 28*a*, 28*b* for the main body 5*a* and the leg section 5*d*, respectively, are extruded separately form the orifices 24*a*, 24*b* of the die head 24 as in the previous embodiment. The continuous body 28*a* for the main body 5*a* is extruded integrally with a ridge 46 which is substantially same in thickness as the leg section 5*d*, and in which the additional core element 25 is embedded. This continuous body 28*a* is subjected to the removal of the predetermined amount of its material, inclusive of the ridge 46, and is thereafter caused to adhere with the continuous body 28*b* for the leg section 5*d*.

In the embodiment shown in FIGS. 15*a* to 15*c*, the continuous bodies 28*a*, 28*b* for the main body 5*a* and the leg section 5*d*, respectively, are extruded separately from the orifices 24*a*, 24*b* of the die head 24 as in the previous embodiment. The continuous body 28*a* for the main body 5*a* is extruded integrally with a ridge 47 which is somewhat greater in thickness than the leg section 5*d*, and in which the additional core element 25 is embedded. This continuous body 28*a* is subjected to the removal of the predetermined amount of its material, inclusive of the ridge 47, and is thereafter caused to adhere with the continuous body 28*b* for the leg section 5*d*.

Figure 16:
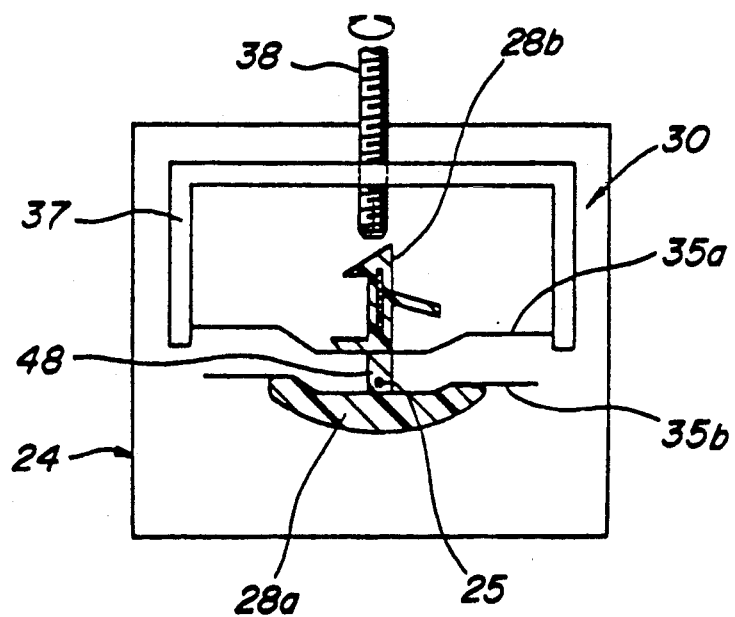

In the embodiment shown in FIG. 16, the continuous bodies 28*a*, 28*b* for the main body 5*a* and the leg section 5*d*, respectively, are extruded from the die head 24 as being adhered to each other. These extruded bodies 28*a*, 28*b* are separated from each other by a stationary cutter element 35*a*. Subsequently, one of the extruded bodies, e.g. the extruded body 28*b* for the leg section 5*d* as in the illustrated example, is subjected to removal of a predetermined amount of material 48 by a movable cutter element 35*b*. The two extruded bodies 28*a*, 28*b* are then caused to adhere with each other once again. The amount of the material 48 to be removed can be varied by gradually displacing the movable cutter element 35*b* toward and away from the stationary cutter element 35*a*.

In the above-mentioned embodiments of the present invention, the operation of the production line is controlled in accordance with the feeding length of the core element 11. However, this is not a prerequisite condition; the operation of the production line may be controlled in accordance with the feeding length of the additional core element 25 or with the hauling length of the continuous composite body 29.

It will be appreciated from the foregoing description that the present invention makes it possible to readily and reliably manufacture window molding members with upper and side segments of basically same and slightly different crosssection, in a continuous manner and with a higher productivity. The window molding member according to the present invention can be easily combined with the window plate, and mounted in place without deteriorating the appearance.

Furthermore, the present invention provides a method which includes the steps of extruding continuous bodies corresponding to the main body and the leg section of the molding member, removing a predetermined amount of material from at least one of the extruded continuous bodies, and thereafter causing the extruded bodies to adhere with each other. The method according to the present invention thus allows an efficient manufacture of molding members with excellent appearance, and achieves a remarkable reduction in the manufacturing cost.

What is claimed is:

1. A window molding member for automobiles having a body panel with an outer surface, a flange which is recessed from said outer surface, and a shoulder portion connecting said flange with said outer surface, a window plate mounted on said flange of the body panel, said window plate having a peripheral edge opposing said shoulder portion of the body panel so as to form a gap therebetween, said window molding member comprising:

an upper segment to extend along an upper edge of the window plate, a side segment to extend along a side edge of the window plate, and a corner segment integrally and continuously connecting said upper and side segments with each other in a longitudinal direction of said window molding member, each segment comprising:

a main body covering said gap, said main body comprising first and second lip sections on both sides thereof, said first lip section contacting said outer surface of said body panel and said second lip section projecting over the peripheral edge of the window plate;

a leg section which is integral with, and projects from said main body to extend into said gap with a predetermined projection length as measured between said main body and a free end of the leg section;

said leg section having means for defining a groove on one side of said leg section, said groove accommodating said peripheral edge of the window plate, said groove extending along substantially an entire length of the window molding member, said groove being spaced from the second lip section by a first predetermined distance along the upper segment of the window molding member and being spaced by a second predetermined distance from the second lip section along the side segment of the window molding member, said second predetermined distance being greater than said first predetermined distance, the arrangement being such that the second lip section of the main body for the upper segment contacts an outer surface of the window plate, and the second lip section for the side segment defines a channel between the second lip section and the window plate, the shoulder portion of the body panel being at a third predetermined distance from the outer surface of the body panel and the outer surface of the window plate at a first region which corresponds to the upper segment of the window molding member and the shoulder portion being at a fourth predetermined distance from the outer surface of the body panel and the outer surface of the window plate at a second region which corresponds to the side segment of the window molding member, said fourth predetermined distance of the shoulder portion being greater than the third predetermined distance, and the second predetermined distance along the side segment being greater than the first predetermined distance along the upper segment by an amount which is substantially the same as the difference between the third and fourth predetermined distances of the shoulder portion, respectively.

2. The window molding member as claimed in claim 1, wherein said window plate has a thickness, defined by said surface and a rear surface, said means for defining said groove comprising a first and a second web formed on said one side of the leg section and spaced from each other by a fifth predetermined distance corresponding to the thickness of said window plate, said first and second webs engaging with said outer and rear surfaces of said window plate, respectively.

3. The window molding member as claimed in claim 2, wherein said second lip section has a recess, said recess being located between said second lip section and said outer surface of said window plate, said recess having a depth equal to or greater than a thickness of said first web.

4. The window molding member as claimed in claim 1, wherein said leg section comprises a fin which engages said shoulder portion of said body panel.

5. The window molding member as claimed in claim 4, wherein said fin is positioned to be opposed to said shoulder portion.

6. The window molding member as claimed in claim 1, wherein said leg section comprises a core element which is embedded in said leg section.

7. A molding member for automobiles to be used with an automobile body panel and a window plate, said molding member being substantially T-shaped, said molding member comprising an upper segment to extend along an upper edge of the window plate, a side segment to extend along a side edge of the window plate, and a corner segment integrally and continuously connecting said upper and side segments with each other in a longitudinal direction of said molding member, each segment comprising:

a main body forming a top of said T, said main body comprising first and second lip sections on each side of the top of said T, said first lip section positioned to be in contact with said body panel and said second lip section positioned to project over an edge of the window plate;

a leg section forming a base of said T having a fin projecting from one side of said leg section and positioned to engage said body panel;

said leg section having a groove on a side thereof opposite said fin to accommodate said window plate, said groove extending along substantially an entire length of the molding member, said groove being spaced from the second lip section by a first predetermined distance along the upper segment of the molding member and being spaced by a second predetermined distance from the second lip section lip section along the side segment of the molding member, said second predetermined distance being greater than said first predetermined distance, the arrangement being such that the second lip section of the main body for the upper segment contacts an outer surface of the window plate, and the second lip section for the side segment defines a channel between the second lip section and the window plate, a shoulder portion of the automobile body panel being at a third predetermined distance from the outer surface of the automobile body panel and the outer surface of the window plate at a first region which corresponds to the upper segment of the molding member and the shoulder portion being at a fourth predetermined distance from the outer surface of the automobile body panel and the outer surface of the window plate at a second region which corresponds to the side segment of the molding member, said fourth predetermined distance of the shoulder portion being greater than the third predetermined distance, and the second predetermined distance along the side segment being greater than the first predetermined distance along the upper segment by an amount which is substantially the same as the difference between the third and fourth predetermined distances of the shoulder portion, respectively.

* * * * *